United States Patent
Li

(10) Patent No.: US 12,150,442 B2
(45) Date of Patent: Nov. 26, 2024

(54) METHOD FOR MANUFACTURING FLYSWATTER HAVING CONDUCTIVE PLASTIC ELECTRODE NET, AND FLYSWATTER STRUCTURE OBTAINED THEREBY

(71) Applicant: Jianming Li, Guangdong Province (CN)

(72) Inventor: Jianming Li, Guangdong Province (CN)

( * ) Notice: Subject to any disclaimer, the term of this patent is extended or adjusted under 35 U.S.C. 154(b) by 159 days.

(21) Appl. No.: 17/607,562

(22) PCT Filed: Dec. 6, 2019

(86) PCT No.: PCT/CN2019/123491
§ 371 (c)(1),
(2) Date: Oct. 29, 2021

(87) PCT Pub. No.: WO2020/233100
PCT Pub. Date: Nov. 26, 2020

(65) Prior Publication Data
US 2022/0217964 A1    Jul. 14, 2022

(30) Foreign Application Priority Data

May 20, 2019    (CN) .......................... 201910420448.1

(51) Int. Cl.
*A01M 3/02*    (2006.01)
(52) U.S. Cl.
CPC .................................. *A01M 3/025* (2013.01)
(58) Field of Classification Search
CPC ........... A01M 3/00; A01M 3/02; A01M 3/025
(Continued)

(56) References Cited

U.S. PATENT DOCUMENTS

| 1,910,623 A | * | 5/1933 | McWilliams | ......... A01M 1/223 |
| | | | | 43/112 |
| 2,881,554 A | * | 4/1959 | Laine | .................... A01M 3/025 |
| | | | | D22/124 |

(Continued)

FOREIGN PATENT DOCUMENTS

| CN | 2095542 U | 2/1992 |
| CN | 2240853 Y * | 11/1996 |

(Continued)

OTHER PUBLICATIONS

International Search Report for International Application No. PCT/CN2019/123491; Date of Mailing, May 6, 2020.

*Primary Examiner* — Darren W Ark
(74) *Attorney, Agent, or Firm* — CANTOR COLBURN LLP

(57) ABSTRACT

A method for manufacturing a flyswatter having a conductive plastic electrode net, and a flyswatter structure obtained thereby are provided. The method may include the following steps: (i) using an insulating plastic to perform injection molding, so as to obtain a flyswatter body; and (ii) using a conductive plastic to perform second injection molding on the flyswatter body to manufacture an electric net component, such that the electric net component and the flyswatter body are integrated with each other. The flyswatter structure includes the flyswatter body and the electric net component. The flyswatter body includes a shaft, a handle, and a frame. The handle has an inner chamber for installing a power control circuit and a battery therein. The electric net component consists of a positive electrode portion and a negative electrode portion. The positive electrode portion includes several strip-shaped positive electrode conductors and a positive electrode conductive connector, and the negative electrode portion includes several strip-shaped negative electrode conductors and a negative electrode conductive (Continued)

connector. The flyswatter structure does not require various manufacturing materials, and can achieve material saving during manufacturing.

3 Claims, 2 Drawing Sheets

(58) Field of Classification Search
USPC .................................................. 43/137, 112
See application file for complete search history.

(56) References Cited

U.S. PATENT DOCUMENTS

| | | | | |
|---|---|---|---|---|
| 3,798,828 | A * | 3/1974 | Walti | A01M 3/02 |
| | | | | 43/137 |
| 4,158,268 | A * | 6/1979 | DeYoreo | A01M 1/223 |
| | | | | 174/138 R |
| 5,377,446 | A * | 1/1995 | DiLeo | A01M 3/02 |
| | | | | 43/137 |
| 5,519,963 | A * | 5/1996 | Shih | A01M 1/223 |
| | | | | 43/112 |
| 5,533,298 | A * | 7/1996 | Teng | A01M 3/025 |
| | | | | 43/112 |
| 6,341,444 | B1 * | 1/2002 | Cina | A01M 1/223 |
| | | | | 43/112 |
| 6,609,330 | B1 * | 8/2003 | Heitman | A01M 1/223 |
| | | | | 43/132.1 |
| 8,181,385 | B2 * | 5/2012 | Mars | A01M 3/025 |
| | | | | 43/132.1 |
| 2007/0101639 | A1 * | 5/2007 | Huang | A01M 3/025 |
| | | | | 43/112 |
| 2008/0028668 | A1 * | 2/2008 | Pollman | A01M 29/28 |
| | | | | 116/22 A |
| 2017/0071185 | A1 * | 3/2017 | Janowski | A01M 3/025 |
| 2018/0343848 | A1 * | 12/2018 | De Nora | A01M 1/223 |

FOREIGN PATENT DOCUMENTS

| | | | | | |
|---|---|---|---|---|---|
| CN | 2250016 | Y | * | 3/1997 | |
| CN | 2253908 | Y | | 5/1997 | |
| CN | 2297060 | Y | | 11/1998 | |
| CN | 105981707 | A | * | 10/2016 | |
| CN | 205813357 | U | * | 12/2016 | |
| CN | 205922623 | U | | 2/2017 | |
| CN | 206933095 | U | | 1/2018 | |
| CN | 110089509 | A | * | 8/2019 | ............ A01M 3/025 |
| CN | 210113984 | U | * | 2/2020 | |
| CN | 210113985 | U | * | 2/2020 | |
| CN | 111053075 | A | * | 4/2020 | ............ A01M 3/025 |
| DE | 202004006747 | U1 | * | 10/2004 | ............ A01M 1/223 |
| KR | 200459586 | Y1 | * | 3/2012 | |
| KR | 101373249 | B1 | * | 3/2014 | |
| KR | 101420358 | B1 | * | 7/2014 | |

* cited by examiner

METHOD FOR MANUFACTURING FLYSWATTER HAVING CONDUCTIVE PLASTIC ELECTRODE NET, AND FLYSWATTER STRUCTURE OBTAINED THEREBY

CROSS REFERENCE TO RELATED APPLICATIONS

This is the U.S. national stage of application No. PCT/CN2019/123491 filed on Dec. 6, 2019. Priority under 35 U.S.C. § 119(a) and 35 U.S.C. § 365(b) is claimed from Chinese Application No. 201910420448.1, filed May 20, 2019, the disclosure of which is also incorporated herein by reference.

TECHNICAL FIELD

The present invention relates to a mosquito killing device, in particular to, a method for manufacturing an electric flyswatter, and an electric flyswatter structure.

BACKGROUND ART

The current electric flyswatter includes a plastic electric flyswatter frame bottom cover, a plastic electric flyswatter frame surface cover, a conductive metal wire, a conductive metal wire link line, positive and negative electrode sheets, a plastic handle, a PCB and the like. During manufacture, the conductive metal wire, the conductive metal wire link line and the positive and negative electrode sheets need to be machined by using processes such as polishing and electroplating, and are then connected with each other and installed on the electric flyswatter frame bottom cover, the plastic electric flyswatter frame surface cover, and the handle. Therefore, an existing electric flyswatter is complicated in structure, and various materials are required, such that processes in the manufacturing method are varied and complicated, and meanwhile, the quality is difficult to control, thereby resulting in low production efficiency and high cost.

SUMMARY OF THE INVENTION

The purpose of the present invention is to provide a method for manufacturing an electric flyswatter, and an electric flyswatter structure.

The method for achieving the purpose of the present invention may be achieved by the following technical solution:

a method for manufacturing a flyswatter having a conductive plastic electrode net includes the following steps:

(i) using an insulating plastic to perform injection molding, so as to obtain a flyswatter body, wherein the flyswatter body includes a shaft, a handle, and a frame, and the handle has an inner chamber for installing a power control circuit and a battery therein; and (ii) using a conductive plastic to perform second injection molding on the flyswatter body to manufacture an electric net component, such that the electric net component and the flyswatter body are integrated with each other, wherein the electric net component consists of a positive electrode portion and a negative electrode portion, the positive electrode portion includes several strip-shaped positive electrode conductors and a positive electrode conductive connector, the negative electrode portion includes several strip-shaped negative electrode conductors and a negative electrode conductive connector, and the several strip-shaped positive electrode conductors and the several strip-shaped negative electrode conductors are staggered at intervals in the frame to form an electrode net of an electrostatic field for intercepting and adsorbing mosquitoes; one end of the positive electrode conductive connector is abutted with all the positive electrode conductors, and the other end of the positive electrode conductive connector is connected to a positive electrode end of the power control circuit in the inner chamber at the handle; and one end of the negative electrode conductive connector is abutted with all the negative electrode conductors, and the other end of the negative electrode conductive connector is connected to a negative electrode end of the power control circuit in the inner chamber at the handle.

The method for achieving the purpose of the present invention may further be achieved by the following technical solution:

further, the method further includes the step: using an insulating plastic to perform third injection molding on two sides of the electric net component and the flyswatter body which are integrated with each other to respectively manufacture an upper protective net and a lower protective net, wherein the upper protective net and the lower protective net form an integrated structure together with the flyswatter body and the electric net component, and an electrode net of the electric net component is enabled to be located in the upper protective net, the lower protective net, and the frame.

The electric flyswatter structure for achieving the purpose of the present invention may be achieved by the following technical solution:

provided is a flyswatter structure manufactured by adopting the above-mentioned manufacturing method, including a flyswatter body and an electric net component; the flyswatter body is made of an insulating plastic, and the electric net component is made of a conductive plastic; the flyswatter body includes a shaft, a handle, and a frame, and the handle has an inner chamber for installing a power control circuit and a battery therein; the electric net component consists of a positive electrode portion and a negative electrode portion, the positive electrode portion includes several strip-shaped positive electrode conductors and a positive electrode conductive connector, the negative electrode portion includes several strip-shaped negative electrode conductors and a negative electrode conductive connector, and the several strip-shaped positive electrode conductors and the several strip-shaped negative electrode conductors are staggered at intervals in the frame to form an electrode net of an electrostatic field for intercepting and adsorbing mosquitoes; one end of the positive electrode conductive connector is abutted with all the positive electrode conductors, and the other end of the positive electrode conductive connector is connected to a positive electrode end of the power control circuit in the inner chamber at the handle; and one end of the negative electrode conductive connector is abutted with all the negative electrode conductors, and the other end of the negative electrode conductive connector is connected to a negative electrode end of the power control circuit in the inner chamber at the handle.

The electric flyswatter structure for achieving the purpose of the present invention may be further achieved by the following technical solution:

further, the positive electrode conductors and the negative electrode conductors are respectively connected into the frame from two sides of the frame, such that the several strip-shaped positive electrode conductors and the several strip-shaped negative electrode conductors are staggered at intervals in the frame to form a net-like structure.

Further, reinforcing ribs made of an insulating plastic are arranged in the frame.

Further, the positive electrode conductors and the negative electrode conductors are straight or wavy conductive plastic strips.

Further, the positive electrode conductive connector and the negative electrode conductive connector are conductive lines made of a conductive plastic, and the positive electrode conductive connector and the negative electrode conductive connector are arranged in the shaft, the handle, and the frame.

Further, the frame is round or square.

Further, an upper protective net is arranged on one side of the frame, a lower protective net is arranged on the other side of the frame, the upper protective net and the lower protective net are made of an insulating plastic, and the upper protective net and the lower protective net are respectively arranged on two sides of the electric net component and are fixedly arranged on the frame.

Further, the flyswatter body, the electric net component, the upper protective net and the lower protective net are formed by integral injection molding.

The present invention has the following prominent substantive characteristics and remarkable progresses.

The flyswatter body, the upper protective net and the lower protective net of the electric flyswatter structure are made of the insulating plastic, the electric net component is made of the conductive plastic, and therefore, the material adopted for manufacturing the electric flyswatter structure is relatively simple, convenient to purchase and convenient to manage and control in quality; moreover, the material can be saved during production, and the consumed material is reduced by 40% as comparison with a conventional material, such that the cost is greatly reduced.

2. The electric flyswatter structure is manufactured by using an injection molding method, that is, the electric flyswatter structure is manufactured by using injection equipment and mold, and therefore, the manufacturing links are greatly reduced, dependence on labor is reduced, the labor is reduced by 70% than that of a conventional electric flyswatter, the efficiency is increased by at least 10 times than that achieved by using a conventional manufacturing method, and the quality is easy to guarantee.

3. The flyswatter body in the present invention includes the shaft, the handle and the frame which are made of the insulating plastic, the handle has the inner chamber for installing the power control circuit and the battery therein, and the electric flyswatter structure is simple in structure, easy to manufacture, and capable of forming an integrated structure, such that the product quality is better guaranteed.

4. The electric net component in the present invention is made of the conductive plastic, wherein the positive electrode portion includes the several strip-shaped positive electrode conductors and the positive electrode conductive connector, the negative electrode portion includes the several strip-shaped negative electrode conductors and the negative electrode conductive connector, and the several strip-shaped positive electrode conductors and the several strip-shaped negative electrode conductors are staggered at intervals in the frame to form the electrode net of the electrostatic field for intercepting and adsorbing the mosquitoes; one end of the positive electrode conductive connector is abutted with all the positive electrode conductors, and the other end of the positive electrode conductive connector is connected to the positive electrode end of the power control circuit in the inner chamber at the handle; and one end of the negative electrode conductive connector is abutted with all the negative electrode conductors, and the other end of the negative electrode conductive connector is connected to the negative electrode end of the power control circuit in the inner chamber at the handle. Therefore, the electric net component is simple in product structure, reasonable in design, easy to manufacture, and capable of being better integrated with the flyswatter body, thereby guaranteeing the product quality.

5. The upper protective net is arranged on one side of the frame, the lower protective net is arranged on the other side of the frame, the upper protective net and the lower protective net are made of the insulating plastic, and thus, the upper protective net and the lower protective net may form the integrated structure together with the flyswatter body and the electric net component, the manufacture is simple and easy, the labor cost is better reduced, the production efficiency is increased, and the electric flyswatter structure is more stable in quality, and safe and reliable in use.

6. During production, complicated assembly processes of an existing electric flyswatter are avoided, a finished product is directly injected by using the injection equipment and mold, a PCB and a battery are installed in the inner chamber of the handle during use, and thus, the amount of labor is greatly reduced, the labor cost is reduced, the production efficiency is effectively increased, and the production quality is stable and reliable.

DETAILED DESCRIPTION OF THE INVENTION

Figure 1:
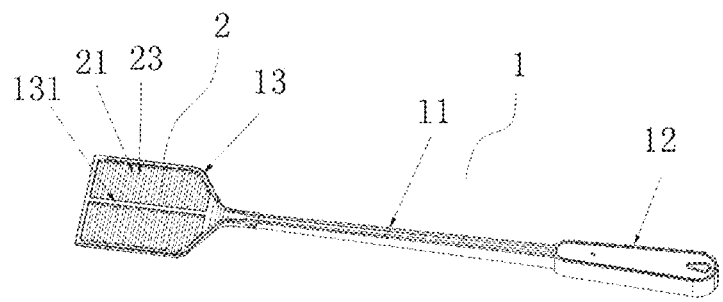
FIG. 1 is a schematic diagram of a structure in embodiment 1 of the present invention.

The present invention will be further described in detail below with reference to the accompanying drawings.

Embodiment 1

Provided is a method for manufacturing a flyswatter having a conductive plastic electrode net, including the following steps:
(i) an insulating plastic is used to perform injection molding, so as to obtain a flyswatter body 1, wherein the flyswatter body 1 includes a shaft 11, a handle 12, and a frame 13, and the handle 12 has an inner chamber 122 for installing a power control circuit 121 and a battery therein; and
(ii) a conductive plastic is used to perform second injection molding on the flyswatter body 1 to manufacture an electric net component 2, such that the electric net component 2 and the flyswatter body 1 are integrated with each other, wherein the electric net component 2 consists of a positive electrode portion and a negative electrode portion, the positive electrode portion includes several strip-shaped positive electrode conductors 21 and a positive electrode conductive connector 22, the negative electrode portion includes several strip-shaped negative electrode conductors 23 and a negative electrode conductive connector 24, and the several strip-shaped positive electrode conductors 21 and the several strip-shaped negative electrode conductors 23 are staggered at intervals in the frame 13 to form an electrode net of an electrostatic field for intercepting and adsorbing mosquitoes; one end of the positive electrode conductive connector 22 is abutted with all the positive electrode conductors 21, and the other end of the positive electrode conductive connector 22 is connected to a positive electrode end of the power control circuit 121 in the inner chamber 122 at the handle 12; and one end of the negative electrode conductive connector 24 is abutted with all the negative electrode conductors 23, and the other end of the negative electrode conductive connector 24 is connected to a negative electrode end of the power control circuit 121 in the inner chamber 122 at the handle 12.

Briefly, the flyswatter manufactured by using the method in the present embodiment is integrally formed by performing injection molding on the flyswatter body 1 and the electric net component 2 twice.

In the method, the diameters of the positive electrode conductors 21 and the negative electrode conductive connector 24 are 0.5 to 2.5 mm, and the distance that the several strip-shaped positive electrode conductors 21 and the several strip-shaped negative electrode conductors 23 are staggered at intervals in the frame 13 may be set as 1 to 10 mm. The diameters of the positive electrode conductive connector 22 and the negative electrode conductive connector 24 are 1.5 to 3.5 mm.

Figure 2:
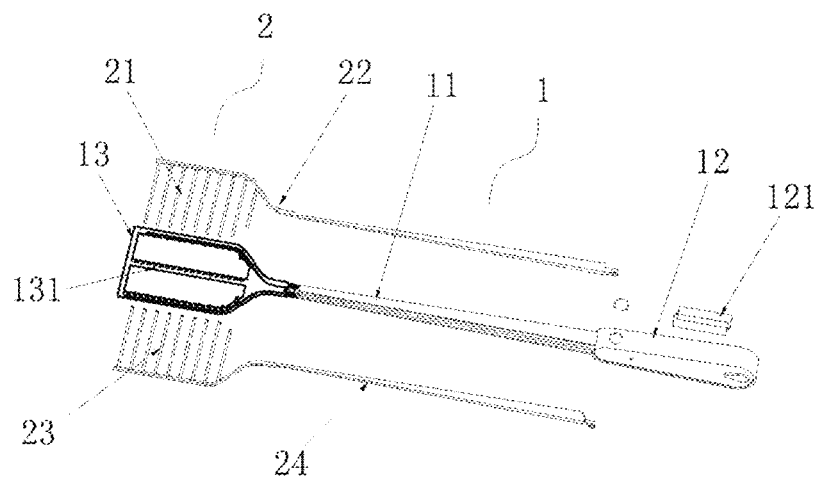
FIG. 2 is an exploded view of the structure in FIG. 1.

Provided is a flyswatter structure manufactured by using the above-mentioned manufacturing method, as shown in FIG. 1 and FIG. 2, including a flyswatter body 1 and an electric net component 2; the flyswatter body 1 is made of an insulating plastic, and the electric net component 2 is made of a conductive plastic; the flyswatter body 1 includes a shaft 11, a handle 12, and a frame 13, and the handle 12 has an inner chamber 122 for installing a power control circuit 121 and a battery therein; during use, a cover body is disposed at an opening of the inner chamber 122; the electric net component 2 consists of a positive electrode portion and a negative electrode portion, the positive electrode portion includes several strip-shaped positive electrode conductors 21 and a positive electrode conductive connector 22, the negative electrode portion includes several strip-shaped negative electrode conductors 23 and a negative electrode conductive connector 24, and the several strip-shaped positive electrode conductors 21 and the several strip-shaped negative electrode conductors 23 are staggered at intervals in the frame 13 to form an electrode net of an electrostatic field for intercepting and adsorbing mosquitoes; one end of the positive electrode conductive connector 22 is abutted with all the positive electrode conductors 21, and the other end of the positive electrode conductive connector 22 is connected to a positive electrode end of the power control circuit 121 in the inner chamber 122 at the handle 12; and one end of the negative electrode conductive connector 24 is abutted with all the negative electrode conductors 23, and the other end of the negative electrode conductive connector 24 is connected to a negative electrode end of the power control circuit 121 in the inner chamber 122 at the handle 12.

In the embodiment, the positive electrode conductors 21 and the negative electrode conductors 23 are straight conductive plastic strips The positive electrode conductive connector 22 and the negative electrode conductive connector 24 are conductive lines made of a conductive plastic, and the positive electrode conductive connector 22 and the negative electrode conductive connector 24 are arranged in the shaft 11, the handle 12, and the frame 13. The frame 13 is square. The electrode net formed by the positive electrode conductors 21 and the negative electrode conductors 23 is arranged in the frame 13.

The positive electrode conductors 21 and the negative electrode conductors 23 are respectively connected into the frame 13 from two sides of the frame 13, specifically, the positive electrode conductors 21 and the negative electrode conductors 23 extend inwards into the frame 13 along the inside of the frame 13, such that the several strip-shaped positive electrode conductors 21 and the several strip-shaped negative electrode conductors 23 are staggered at intervals in the frame 13 to form a net-like structure having horizontal strips.

In order to enhance the use strength of the frame 13 of the flyswatter, reinforcing ribs 131 made of an insulating plastic are arranged in the frame 13, and the reinforcing ribs 131 are intersected with the several strip-shaped positive electrode conductors 21 and the several strip-shaped negative electrode conductors 23.

A finished product of the electric flyswatter provided by the present invention is formed by injection molding by virtue of injection equipment and mold, complicated assembly processes are not needed, and a PCB and a battery are installed in the inner chamber of the handle during use.

Embodiment 2

The method in the present embodiment is technically characterized by further including step 3 in which an insulating plastic is used to perform third injection molding on two sides of the electric net component 2 and the flyswatter body 1 which are integrated with each other to respectively manufacture an upper protective net 3 and a lower protective net 4, wherein the upper protective net 3 and the lower protective net 4 form an integrated structure together with the flyswatter body 1 and the electric net component 2, and an electrode net of the electric net component 2 is enabled to be located in the upper protective net 3, the lower protective net 4, and the frame 13. Specifically, the insulating plastic is used to perform third injection molding on two sides of the flyswatter body 1 and the electric net component 2 which are integrated with each other, injection molding is performed on one side of the flyswatter body 1 and the electric net component 2 to generate the upper protective net 3, and injection molding is performed on the other side of the flyswatter body 1 and the electric net component 2 to generate the lower protective net 4, the upper protective net 3 and the lower protective net 4 may be formed by respectively performing injection molding, that is, performing injection molding twice, or the upper protective net 3 and the lower protective net 4 may be formed by performing injection molding at the same time, that is, performing injection molding once, such that the upper protective net 3 and the lower protective net 4 form an integrated structure together with the flyswatter body 1 and the electric net component 2. The rest parts are the same as those in the above-mentioned embodiment.

Figure 3:
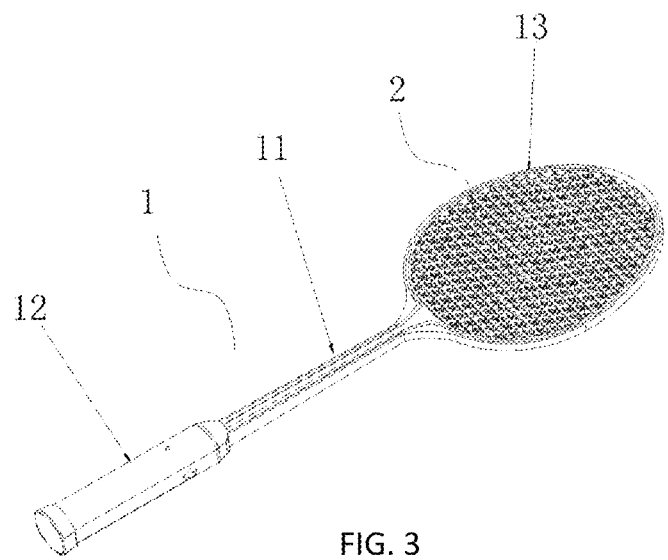
FIG. 3 is a schematic diagram of a structure in embodiment 2 of the present invention.
Figure 4:
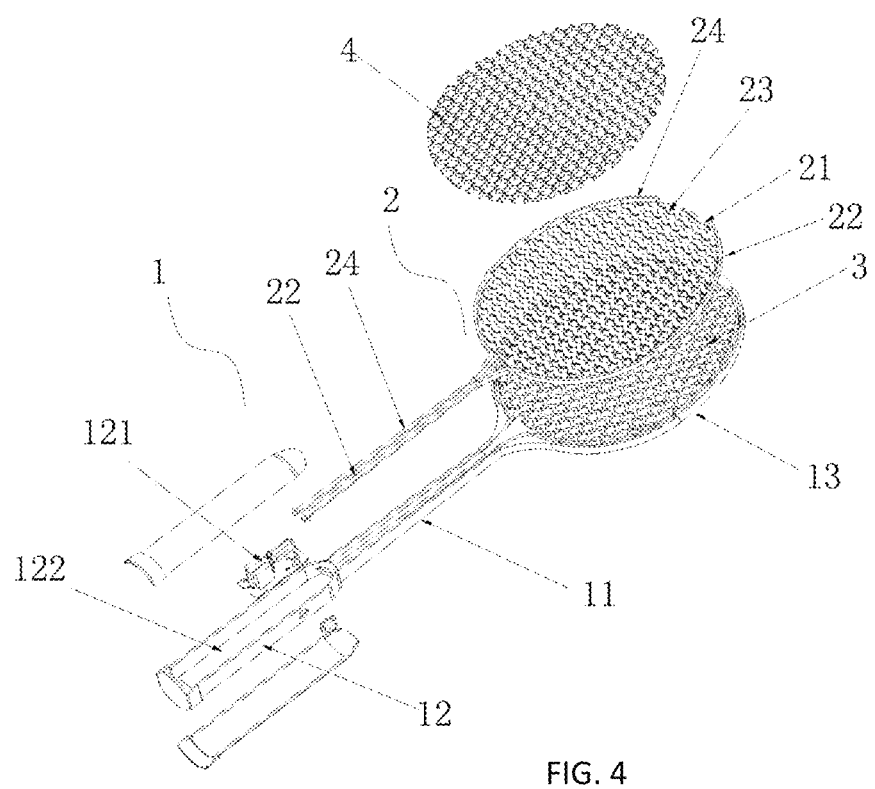
FIG. 4 is an exploded view of the structure in FIG. 3.

In the flyswatter structure manufactured by using the above-mentioned method, as shown in FIG. 3 and FIG. 4, the frame 13 is elliptical. The positive electrode conductors 21 and the negative electrode conductors 23 are wavy conductive plastic strips. In order to avoid electric shock easily caused by the electrode net, formed by staggering the several strip-shaped positive electrode conductors 21 and the several strip-shaped negative electrode conductors 23 at intervals in the frame 13, of the electrostatic field for intercepting and adsorbing the mosquitoes, the upper protective net 3 is arranged on one side of the frame 13, the lower protective net 4 is arranged on the other side of the frame 13, the upper protective net 3 and the lower protective net 4 are made of an insulating plastic, and the upper protective net 3 and the lower protective net 4 are respectively arranged on two sides of the electric net component 2 and are fixedly arranged on the frame 13. During specific manufacture, the flyswatter body 1, the electric net component 2, the upper protective net 3 and the lower protective net 4 are formed by integral injection molding, and the rest parts are the same as those in the above-mentioned embodiment.

Briefly, the flyswatter manufactured by using the method in the present embodiment is integrally formed by performing injection molding on the flyswatter body 1, the electric net component 2, the upper protective net 3 and the lower protective net 4 twice or three times.

The above descriptions are not intended to limit the present invention in any forms, but merely as embodiments thereof. Equivalent implementations of changes such as variations or modifications made by any one skilled in the art based on the disclosed structure and technical contents without departing from the scope of the technical solutions of the present invention shall fall within the protection scope of the present invention.

What is claimed is:

1. A flyswatter structure, comprising:
    a flyswatter body made of an insulating plastic, the flyswatter body comprising:
        a shaft;
        a handle connected to the shaft and having an inner chamber in which a power control circuit and a battery is installed therein; and
        a frame connected to the shaft; and
    an electric net component made of a conductive plastic, the electric net component consisting of:
        a positive electrode portion comprising:
            several strip-shaped positive electrode conductors; and
            a positive electrode conductive connector; and
        a negative electrode portion comprising:
            several strip-shaped negative electrode conductors; and
            a negative electrode conductive connector,
    wherein the several strip-shaped positive electrode conductors and the several strip-shaped negative electrode conductors are made of the conductive plastic and are staggered at intervals in the frame to form an electrode net of an electrostatic field for intercepting and adsorbing mosquitoes;
    wherein one end of the positive electrode conductive connector is abutted with all of the positive electrode conductors, and an other end of the positive electrode conductive connector is connected to a positive electrode end of the power control circuit in the inner chamber at the handle;
    wherein one end of the negative electrode conductive connector is abutted with all of the negative electrode conductors, and an other end of the negative electrode conductive connector is connected to a negative electrode end of the power control circuit in the inner chamber at the handle;
    wherein the positive electrode conductive connector and the negative electrode conductive connector are conductive lines made of the conductive plastic, and the positive electrode conductive connector and the negative electrode conductive connector are arranged in the shaft, the handle, and the frame;
    wherein an upper protective net is arranged on one side of the frame, a lower protective net is arranged on an other side of the frame, the upper protective net and the lower protective net are made of the insulating plastic, and the upper protective net and the lower protective net are respectively arranged on two sides of the electric net component and are fixedly arranged on the frame;
    wherein the flyswatter body, the electric net component, the upper protective net and the lower protective net are formed by integral injection molding; and
    wherein the positive electrode conductors and the negative electrode conductors are wavy conductive plastic strips.

2. The flyswatter structure of claim 1, wherein the positive electrode conductors and the negative electrode conductors are respectively connected into the frame from two sides of the frame, such that the several strip-shaped positive electrode conductors and the several strip-shaped negative electrode conductors are staggered at intervals in the frame to form a net-like structure.

3. The flyswatter structure of claim 1, wherein the frame is round or square.

* * * * *